United States Patent [19]
Leitch

[11] Patent Number: 5,729,575
[45] Date of Patent: Mar. 17, 1998

[54] TRANSMITTER AND RECEIVER SYSTEM AND METHOD UTILIZING A PILOT CARRIER NOTCH DATA ENCODED SIGNAL

[75] Inventor: Clifford Dana Leitch, Coral Springs, Fla.

[73] Assignee: Motorola, Inc., Schaumburg, Ill.

[21] Appl. No.: 492,542

[22] Filed: Jun. 20, 1995

[51] Int. Cl.$^6$ ............................. H03C 5/00; H04L 27/02; H03D 5/00
[52] U.S. Cl. ..................... 375/268; 375/300; 332/161; 329/349; 455/108
[58] Field of Search ........................... 325/268, 300, 325/261, 269, 298, 320, 340; 332/149, 159, 160, 161; 329/347, 349, 351, 353; 455/39, 63, 108, 334

[56] References Cited

U.S. PATENT DOCUMENTS

| | | | |
|---|---|---|---|
| 4,516,087 | 5/1985 | Bruene | 332/17 |
| 5,113,414 | 5/1992 | Karam et al. | 375/60 |
| 5,319,676 | 6/1994 | Van Dasler et al. | 375/60 |

OTHER PUBLICATIONS

TIA/EIA Interim Standard 95: Mobile Station–Base Station Compatibility Standard for Dual Mode Wideband Spread Spectrum Cellular Standard, Jul. 1993.

Oppenheim and Schafer, Digital Signal Proccessing, pp. 674–689, 1989.

*Primary Examiner*—Wellington Chin
*Assistant Examiner*—William Luther
*Attorney, Agent, or Firm*—Keith A. Chanroo

[57] ABSTRACT

A digital transmission system for a selective call message communication network such as a paging network utilizes a quadrature amplitude modulation (QAM) transmitter (40) and receiver (42). The QAM transmitter (40) receives as a modulating input thereto, a message data encoded signal with a pilot carrier in a notch of the power spectrum of the signal. In order to generate the signal, the system generates a Hilbert transform of a wave-form representing message data to be transmitted. The Hilbert transform and message data waveform are combined to provide a positive frequency component and a negative frequency component. These frequency components are shifted apart and combined to provide a notch in which a DC component can be added to form a pilot carrier. A receiver of the system removes the pilot carrier from a received signal and shifts the positive and negative frequency components together to recover the message data.

29 Claims, 7 Drawing Sheets

1

TRANSMITTER AND RECEIVER SYSTEM AND METHOD UTILIZING A PILOT CARRIER NOTCH DATA ENCODED SIGNAL

FIELD OF INVENTION

The present invention relates to a selective call message communication system and method and more particularly to a system and method for generating a signal encoded with message data and a pilot carrier in a notch of a power spectrum of the signal for transmission by an amplitude modulation transmitter. The system also includes a receiver for recovering a signal representing the transmitted message data.

BACKGROUND OF THE INVENTION

Digital transmission systems such as quadrature amplitude modulation systems (QAM) utilize coherent detection schemes. These systems make the most efficient use of available power and bandwidth. Correct demodulation of the transmitted signal by a receiver in these coherent systems, however, requires an unmodulated carrier component having the correct amplitude and phase. Most coherent systems do not transmit the carrier component but derive it at the receiver by indirect means. If the unmodulated carrier component having correct amplitude and phase is not available at the receiver, severe signal distortion results such that the recovered data has a high bit error rate.

Known receivers commonly employ Costas loop and quadrupling of the signal component to derive the unmodulated carrier frequency component. However, both of these methods require time averaging over long periods. Unfortunately, amplitude and phase changes in a transmission channel can occur much more rapidly than the averaging time constant of these methods. The long time constant of averaging employed by these methods can prevent the recovered carrier component from being able to follow the rapid amplitude and phase variations of the channel. Therefore, these methods are not suitable for use with an unstable channel.

In message communication systems having a portable or mobile receiver such as in paging systems, the amplitude and phase response of the transmission channel can change very rapidly due to Rayleigh fading effects. Amplitude and phase also changes rapidly when simulcasting is employed resulting in an unstable transmission channel. Therefore, the use of a Costas loop or a quadrupling method is not suitable in a portable receiver.

A pilot carrier is a partially suppressed carrier frequency component that is transmitted along with a digital signal as a reference signal for the amplitude or gain and phase of the channel. The transmission channel subjects the pilot carrier to the same gain and phase characteristics as the received data signal so that the received pilot carrier component has the correct gain and phase characteristics with respect to the received data signal. Distortion in the received data signal is thus minimized when the received pilot carrier is used as an unmodulated carrier component in the demodulation process of the receiver. However, heretofore there has been no known way to transmit and receive a pilot carrier with a typical digital quadrature amplitude modulation (QAM) transmission. This is because the typical modulating input signal to the QAM transmitter has a high level of signal energy at and around the carrier frequency so that it is not possible for the receiver to use a frequency selective filter to separate a pilot carrier component from the digital data signal. It is further not practical to use a band-stop filter at the transmitter to make a notch in the power spectrum of the signal around the carrier frequency since such a filter would seriously distort the digital signal.

SUMMARY OF THE INVENTION

In accordance with the present invention, the disadvantages of prior digital transmission systems for selective call message communication networks have been overcome. The selective call message communication transmission system of the present invention generates a signal encoded with message data and having a pilot carrier in a notch of the power spectrum of the signal. This signal is used to provide the modulating inputs to a QAM transmitter. A receiver in the selective call message communication system can therefore use a bandpass filter or the like to separate the pilot carrier from the data signal without interference between the data signal and the pilot carrier.

More particularly, the transmission system of the present invention includes a first waveform generator that is responsive to message data to be transmitted for generating a data waveform that corresponds to the message data. A Hilbert transform generator is also responsive to the message data for generating a waveform that represents the Hilbert transform of the data waveform. The positive and negative frequency components are derived from the data waveform and the Hilbert transform waveform. Thereafter, the positive and negative frequency components are shifted apart and summed to create a notch in a power spectrum of the summed components. A DC component representing a pilot carrier is added to the summed components to form a data encoded signal having a power spectrum with a notch containing the pilot carrier. This data encoded signal is modulated by an amplitude modulator such as a QAM, for transmission to a selective call receiving device.

A receiver in the transmission system is responsive to a received signal containing a notch in a power spectrum thereof for removing the pilot carrier from the signal and thereafter generating the positive and negative frequency components thereof. The positive and negative frequency components are shifted together to remove the notch so as to recover a signal representing the transmitted message data.

These advantages and novel features of the present invention as well as details of an illustrated embodiment thereof, will be more fully understood from the following description and the drawings.

DESCRIPTION OF THE PREFERRED EMBODIMENT

Figure 1:
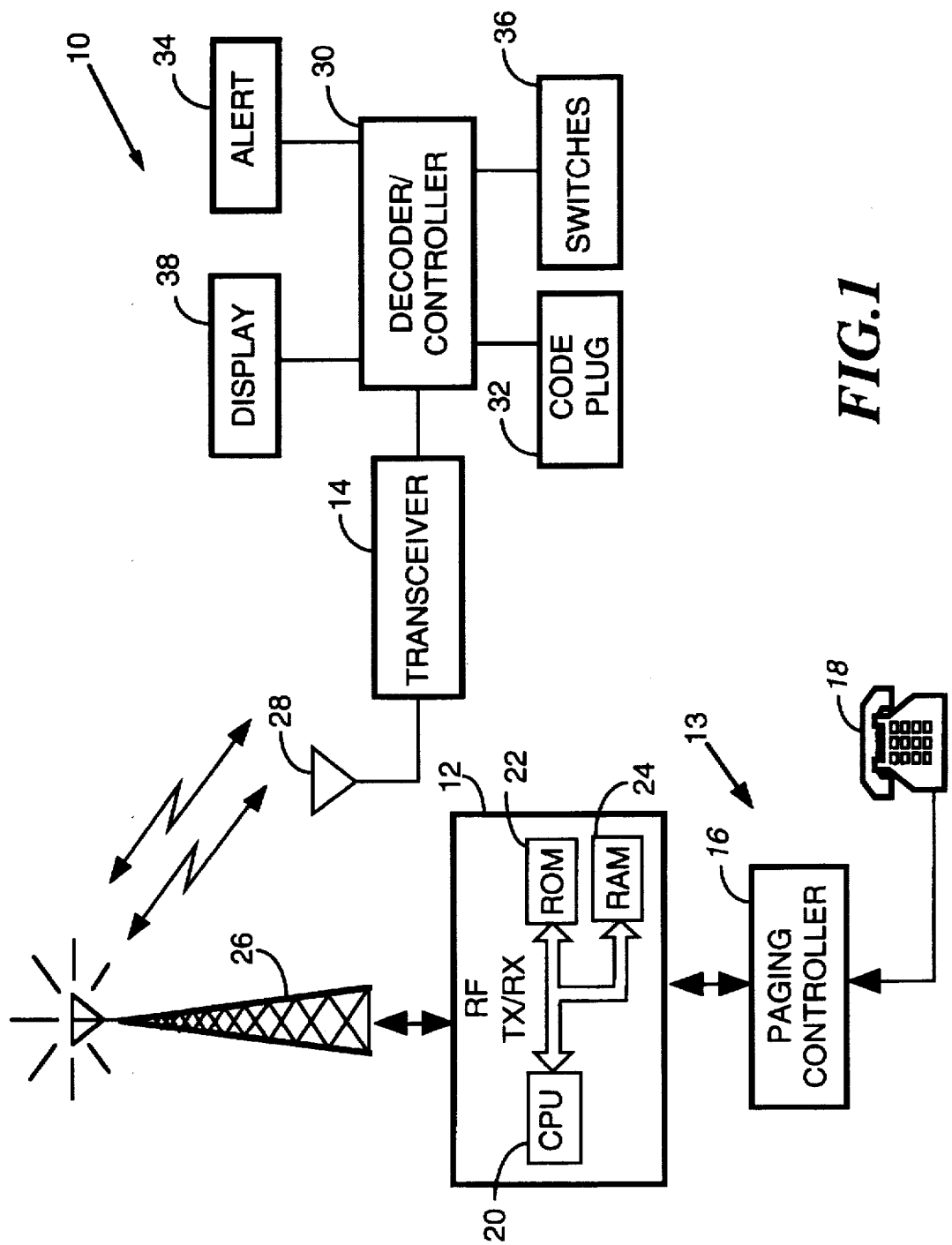
FIG. 1 is a block diagram of an RF communication network including a transmitter and a receiver in accordance with a preferred embodiment of the present invention.

A selective call message communication system, as shown in FIG. 1, includes a selective call receiving device 10 such as a pager that communicates with a paging network 13 utilizing radio frequency (RF) communications. Preferably, the selective call receiving device 10 is a two-way pager having a transceiver 14 that is capable of transmitting message information as well as receiving message information. The message information transmitted and received by the pager 10 and paging network 13 includes digital message data and may include voice message information or data as well.

Figure 5:
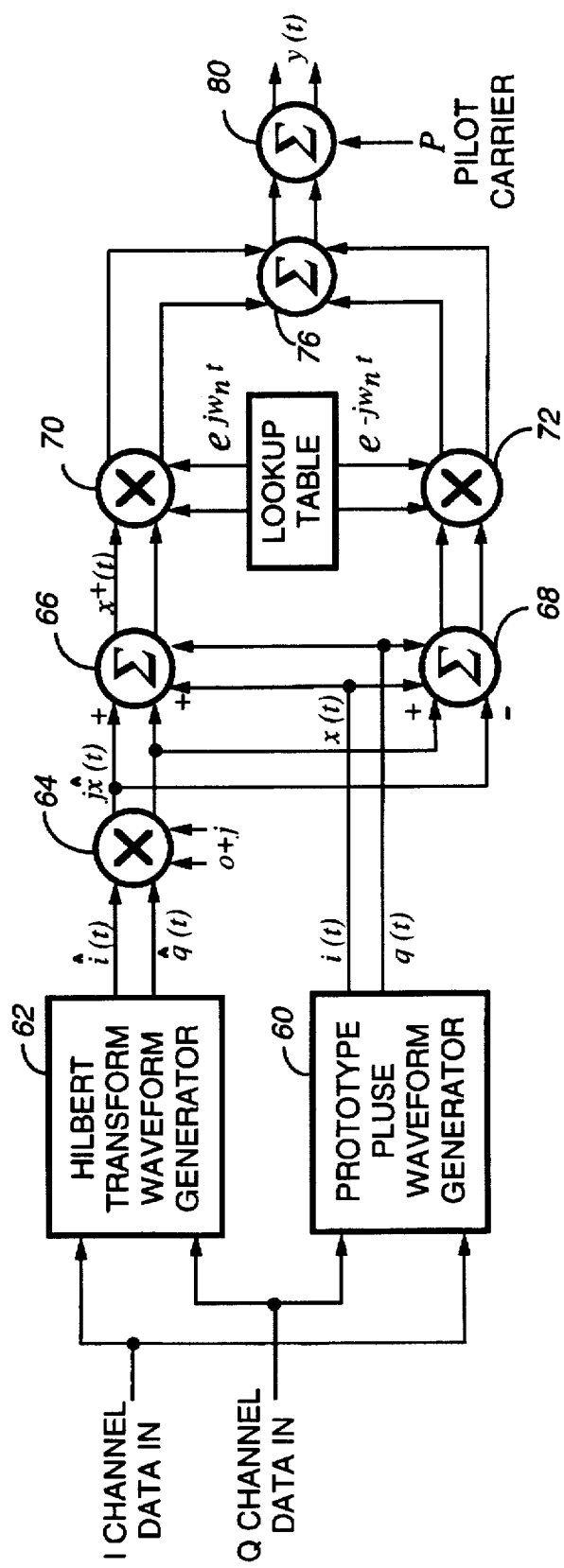
FIG. 5 is a block diagram of a portion of the transmitter illustrated in FIG. 1 for generating a data encoded signal with a pilot carrier notch for application to the quadrature amplitude modulator transmitter shown in FIG. 2.

The paging network 13 includes a paging controller 16 that receives an input message or page initiation message from an input device such as a telephone 18. The paging controller 16 generates a paging message in accordance with a particular signalling protocol which may be, for example, a two-level or four-level signal protocol. The paging message generated by the paging controller 16 is coupled therefrom to a RF transmitter/receiver unit 12. The transmitter/receiver 12 includes a central processing unit 20 that operates in accordance with software stored in a read only memory 22 to process information contained in a random access memory 24. The unit 12 and transceiver 14 forms a quadrature amplitude modulated (QAM) transmission system. The QAM transmitter portion of the unit 12 includes a quadrature amplitude modulator as described below with reference to FIG. 2. The transmitter portion of the unit 12 also includes a system as depicted in FIG. 5 for generating a data encoded signal having a pilot carrier formed in a notch in the signal's power spectrum. This pilot carrier notch data encoded signal is applied to the quadrature amplitude modulator for transmission via an antenna 26.

The pager 10 includes an antenna 28 for intercepting transmitted RF signals and for transmitting RF signals. The antenna 28 couples a received signal to the transceiver 14 wherein the transceiver 14 produces a data stream representative of a demodulated received signal that is coupled to a decoder/controller 30. More particularly, the transceiver 14 includes a receiver portion that employs, as does a receiver portion of the unit 12, a QAM receiver the output of which is coupled to a second receiver portion depicted in detail in FIG. 10 that recovers the pilot carrier and a signal representing the transmitted message data. The transceiver 14 also includes a transmitter portion that is responsive to a modulation input containing message data as discussed above for the unit 12, to transmit the message data via the antenna 28.

As is well-known in the art, the decoder/controller 30 may include a central processing unit such as a microprocessor or the like for processing demodulated signal information in accordance with software stored in a memory of the decoder/controller 30. The decoder/controller 30 is also responsive to inputs from one or more switches 36 or other input devices to generate data that is coupled to the transceiver 14 for transmission.

The RF signals transmitted by the network 13 typically include an address that identifies a particular pager 10 as well as an associated paging message. The decoder/controller 30 decodes a received address by comparing it with one or more addresses stored in a code plug or a code memory 32. If the decoder/controller 30 detects a match between a received address and a stored address, an alert signal is generated by an alerting device 34 so as to alert a user that a page has been received by the device 10. The alert signal may be an audible alert or a tactile alert as is well-known.

Figure 2:
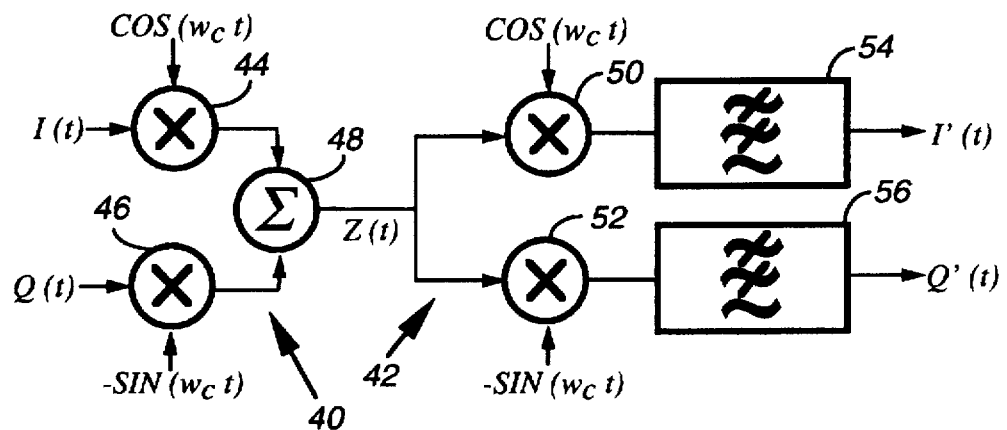
FIG. 2 is a block diagram of a quadrature amplitude modulation transmitter and receiver employed in the system of FIG. 1.

A QAM transmitter 40 and a QAM receiver 42, as employed in the transmitter/receiver unit 12 of the paging network 13 and as employed in the transceiver 14 of the pager 10, is depicted in FIG. 2. A data encoded signal y(t) with a pilot carrier notch as described in detail below, includes real and imaginary parts that are respectively used to form the modulating input signals I(t) and Q(t) for the QAM transmitter 40 where t represents time. An in-phase carrier component $\cos(\omega_c t)$ is generated by an oscillator and is used to multiply the modulating input signal I(t) by a multiplier 44. A quadrature carrier frequency component $-\sin(\omega_c t)$ is used to multiply the modulating input signal Q(t) by a multiplier 46. The products output from the respective multipliers 44 and 46 are summed together by an adder 48 so as to produce a QAM signal, Z(t) for transmission via an antenna 26, 28.

The QAM receiver 42 includes a pair of multipliers 50 and 52 for recovering the in-phase and quadrature modulating components by respectively multiplying the received signal by the in-phase carrier component $\cos(\omega_c t)$ and $-\sin(\omega_c t)$. The outputs from the multipliers 50 and 52 are respectively applied to low pass filters 54 and 56 to remove any spurious portions thereof generated by the multiplication operation. The output of the low pass filters 54 and 56 respectively represent I'(t) and Q'(t) which under ideal conditions are respectively equal to I(t) and Q(t) respectively.

Figure 3:
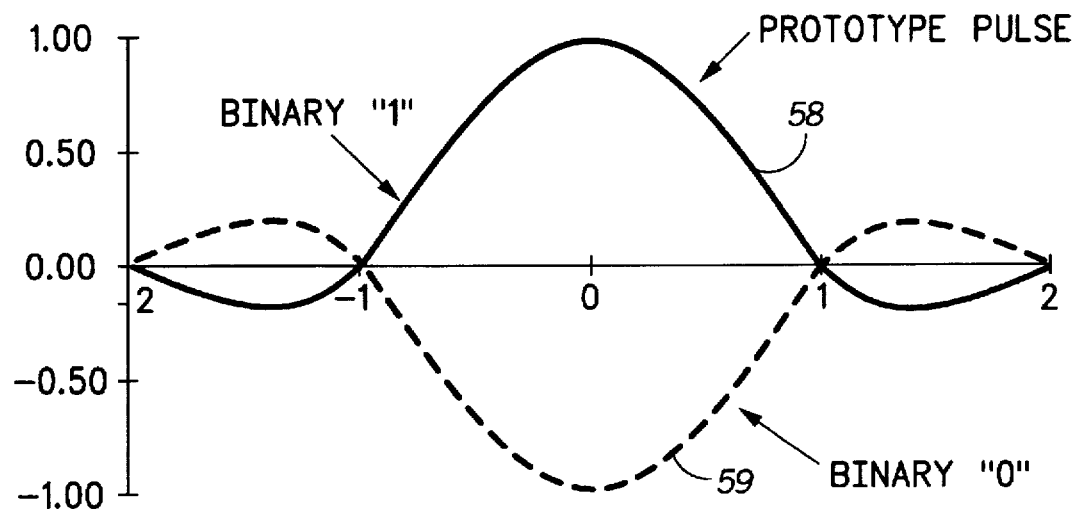
FIG. 3 is an illustration of prototype pulse waveforms representing digital symbols.
Figure 6:
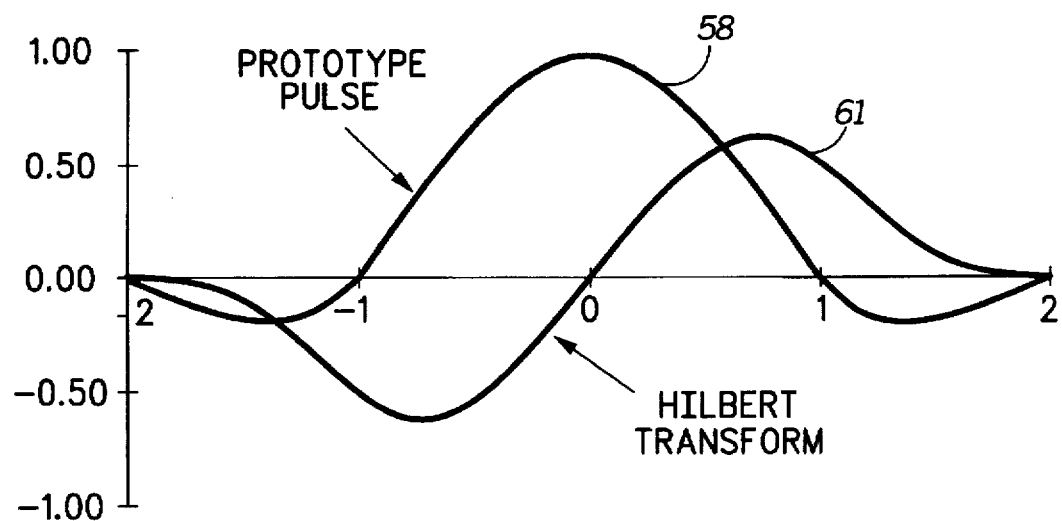
FIG. 6 is a graphic illustration of a prototype pulse data waveform and the Hilbert transform of the data waveform.

The data encoded signal y(t), containing the modulating input signals I(t) and Q(t) for the QAM transmitter 40, is generated by the system shown in FIG. 5. The message data to be transmitted is divided into I-channel data and Q-channel data wherein the separation of the message data may be arbitrary. The I-channel data as well as the Q-channel data is applied to a prototype pulse waveform generator 60. The waveform generator 60 generates prototype pulse data waveforms, examples of which are depicted in FIG. 3. The prototype pulse 58 as shown in FIG. 3 is used to represent a binary "1" symbol whereas its negative, the waveform 59, is used to represent a binary "0" symbol. Non-binary systems may also be implemented with the system of the present invention. For example, the prototype pulse waveforms generated by the waveform generator 60 may be scaled, for example, to four different voltage levels instead of two. The prototype generator 60 may form the prototype waveform pulses in either of two well-known manners. For example, in one embodiment, a series of rectangular pulses corresponding to symbols to be transmitted may be filtered to produce the desired waveforms. Alternatively, the prototype pulses can be stored as sample data and used to generate symbols directly in response to the message data received by the waveform generator 60.

Figure 4:
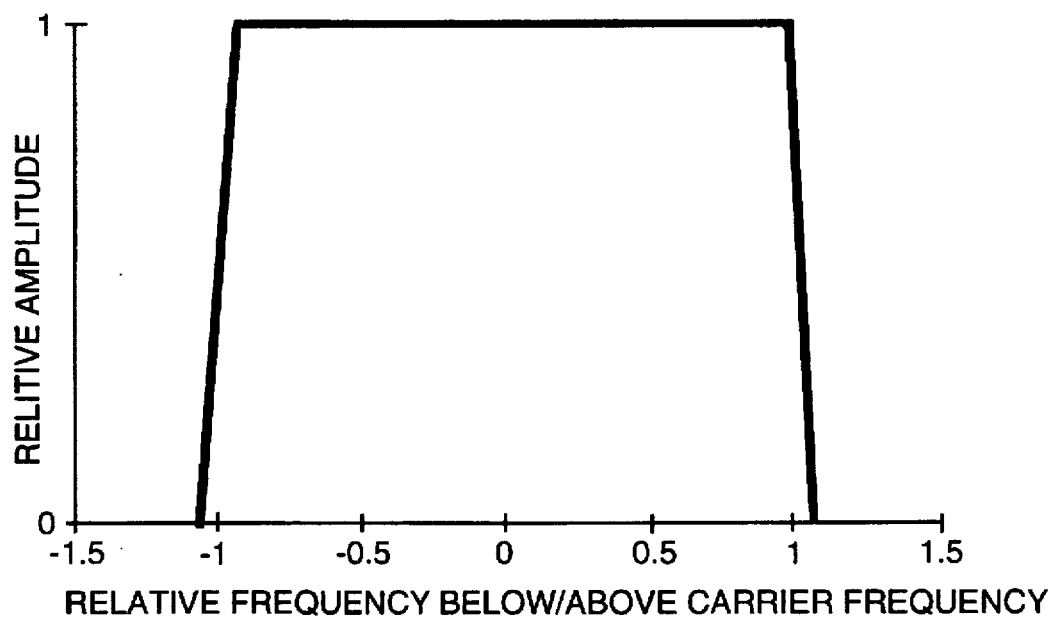
FIG. 4 is a graphic illustration of the power spectrum that is characteristic of the prototype pulse of FIG. 3.

The prototype pulse 58 has a power spectrum as depicted in FIG. 4. As can be seen therein, the spectral density of the pulse 58 is relatively constant over a portion of the bandwidth that is centered on the carrier frequency. Because the power spectrum is continuous around the carrier frequency it is not practical to insert a pilot carrier directly therein and to separate it from the data signal by a filter in the receiver.

In accordance with the present invention, a prototype pulse such as the pulse 58 and a waveform 61 representing the Hilbert transform of the prototype pulse 58 are both used to generate the signal y(t) from which the modulating input signals I(t) and Q(t) for the QAM transmitter are obtained so that there is a notch in the power spectrum of the signal y(t) around the carrier frequency in which a pilot carrier can be formed. Thus, the pilot carrier can be separated by a filter in the receiver without interference from the QAM data signal.

More specifically, referring again to FIG. 5, the prototype pulse waveform generator generates two signals, a waveform i(t) consisting of sequential pulses corresponding to the I-channel data symbols to be transmitted via the I(t) modulating input of the QAM transmitter 40 and a waveform q(t) consisting of sequential pulses corresponding to the Q-channel data symbols to be transmitted via the Q(t) modulating input of the QAM transmitter 40. A Hilbert transform waveform generator 62 similarly generates two waveforms including a waveform î(t) that consists of the Hilbert transform of the sequential pulses corresponding to the symbols represented by the I-channel data and to be transmitted via the I(t) modulating signal. The waveform generator 62 also generates the waveform q̂(t) that consists of the Hilbert transform of the sequential pulses corresponding to the symbols representing the Q-channel data to be transmitted via the Q(t) modulating signal. The two waveforms i(t) and q(t) are treated as the real and imaginary parts of a complex signal:

$$x(t)=i(t)+jq(t).$$

Similarly, the two waveforms output from the Hilbert transform waveform generator 62 are treated as the real and imaginary parts of a complex signal:

$$\hat{x}(t)=\hat{i}(t)+j\hat{q}(t).$$

Although it is mathematically equivalent to first generate the signal x(t) and to then generate the Hilbert transform thereof to create $\hat{x}(t)$, in general, x(t) contains a DC, i.e. zero frequency, component and the Hilbert transform is not defined for DC. In practice, therefore, it is very difficult by either analog or digital signal processing, to obtain a satisfactory Hilbert transform of a signal containing frequency components at or near DC. The present invention overcomes this problem by generating the Hilbert transform components directly from the Hilbert transform waveform 61 of the I-channel and Q-channel data. A signal $j\hat{x}(t)$ is generated by multiplying $\hat{x}(t)$ by (0+j) employing a multiplier 64 to which the output waveforms from the Hilbert transform waveform generator 62 are applied. The signal $j\hat{x}(t)$ is as follows:

$$j\hat{x}(t)=j\hat{i}(t)-\hat{q}(t).$$

Utilizing a well-known property of the Hilbert transform, the signals can be separated into their positive and negative frequency components utilizing an adder 66 and a subtracter 68. More particularly, the signal x(t) and the signal $j\hat{x}(t)$ are summed by the adder 66 to provide the positive frequency component $$x(t)+j\hat{x}(t)=i(t)+jq(t)+j\hat{i}(t)-\hat{q}(t).$$

The subtracter 68 subtracts the signal $j\hat{x}(t)$ from the signal x(t) to obtain the negative frequency component of the signals wherein $$x(t)-j\hat{x}(t)=i(t)+jq(t)-j\hat{i}(t)+\hat{q}(t).$$

Figure 7:
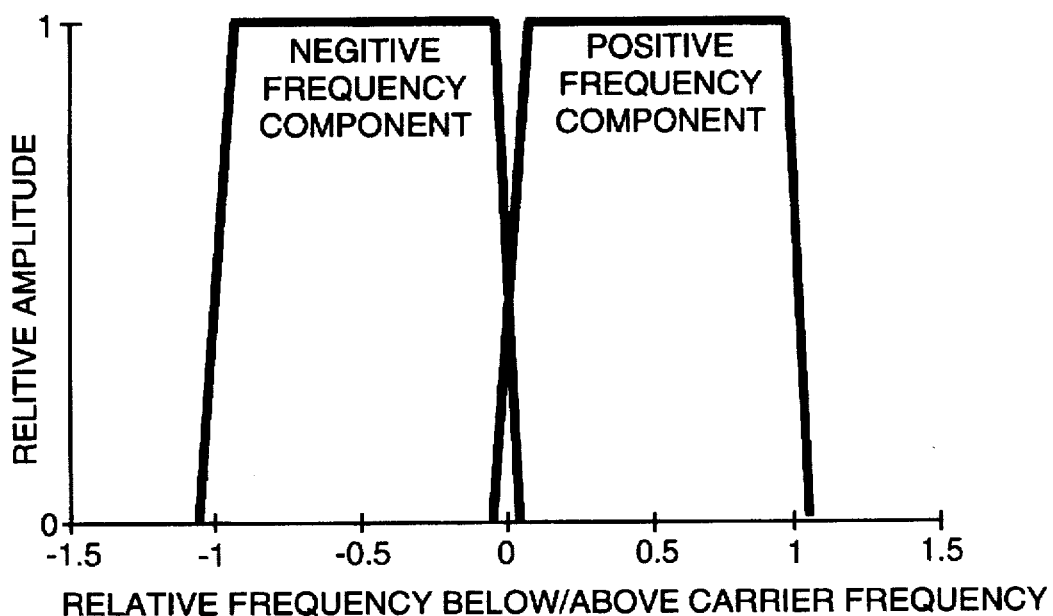
FIG. 7 is an illustration of the power spectrum of the positive and negative frequency components of the prototype pulse data waveform and Hilbert transform waveform shown in FIG. 6.

The power spectrum of the positive frequency component and negative frequency component is shown in FIG. 7.

Figure 8:
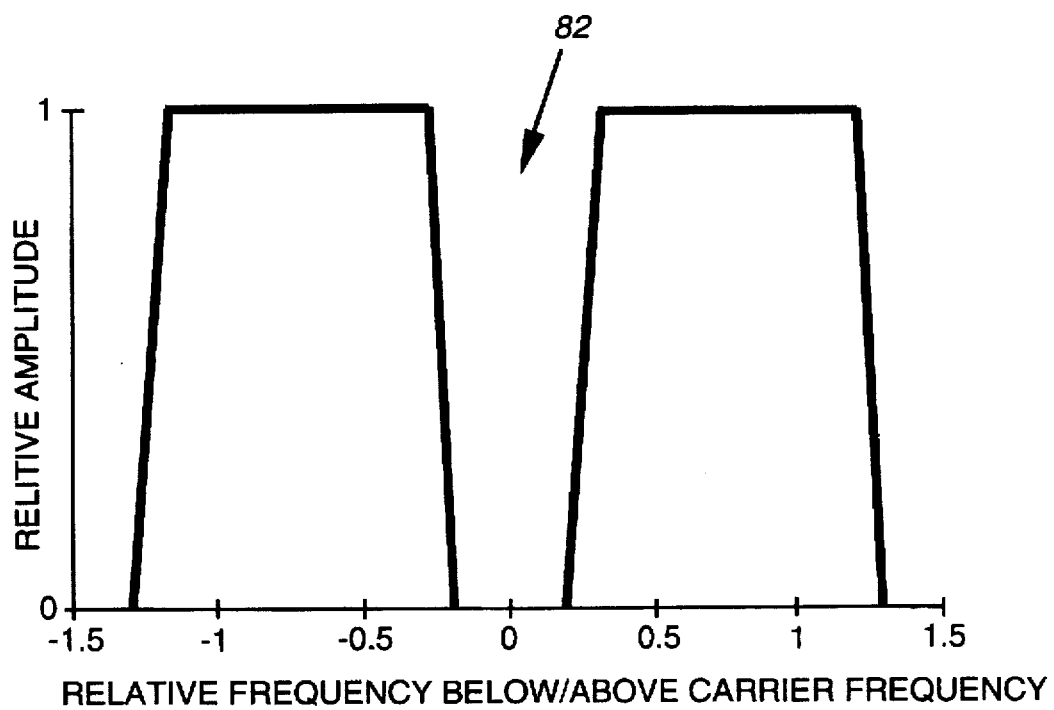
FIG. 8 is an illustration of a power spectrum of a signal having a notch formed therein by shifting apart the positive and negative frequency components shown in FIG. 7.

The positive frequency component and negative frequency component can be shifted apart by multiplying the components by a complex exponential. More particularly, the positive frequency component output from the adder 66 is multiplied by the complex exponential $e^{j\omega t}$ to shift the component by an amount, $+\omega_n$, in radians/sec. Similarly, the negative frequency component output from the subtracter 68 is shifted by an amount $-\omega_n$ by multiplying the negative frequency component by the complex exponential $e^{-j\omega t}$ by a multiplier 72. Various values of the complex exponentials utilized by the multiplier 70 and 72 to shift the positive and negative frequency components may be stored in a look up table 74 for various sample times, t. An illustration of the power spectrum of the shifted positive and negative frequency components is depicted in FIG. 8. As can be seen therein, a notch 82 is created in the power spectrum of the positive and negative frequency components.

Figure 9:
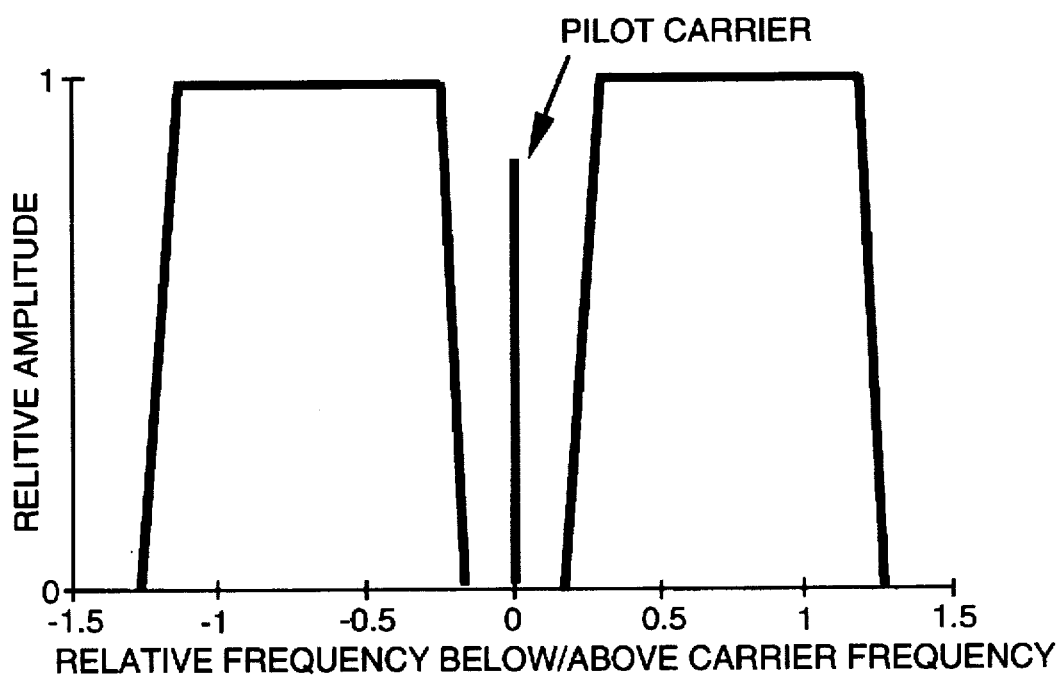
FIG. 9 is an illustration of a power spectrum as depicted in FIG. 8 with a pilot carrier contained in the notch.

After shifting the positive and negative frequency components, the system of FIG. 5 utilizes an adder 76 to sum the shifted positive and negative frequency components. The output of the adder 76 is applied to an adder 80 to which is also applied a DC component representing the pilot carrier so as to generate the signal y(t). As discussed above, y(t) is a data encoded signal with a pilot carrier notch having a power spectrum as depicted in FIG. 9 with the pilot carrier formed in the notch of the power spectrum of the shifted positive and negative frequency components of the signal. The real and imaginary parts of the signal y(t) are, respectively, the I(t) and Q(t) modulating input signals that are used to modulate the QAM transmitter 40.

Figure 11:
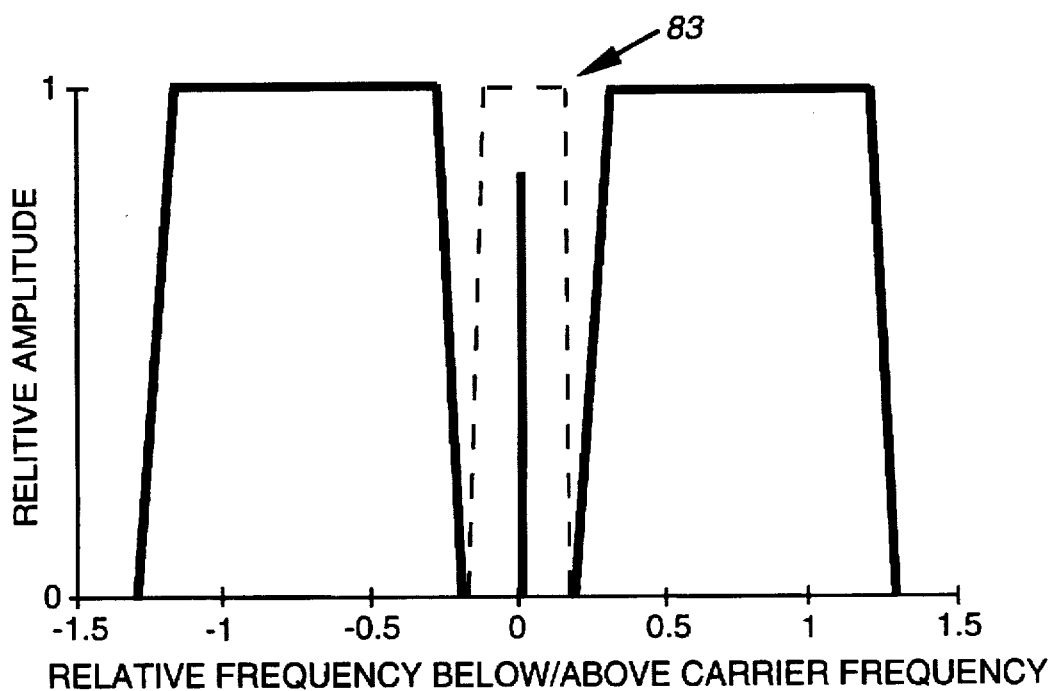
FIG. 11 is a graphic illustration of a power spectrum as depicted in FIG. 9 depicting the gain versus frequency characteristics of a filter suitable for separating the pilot carrier component from the QAM signal.
Figure 10:
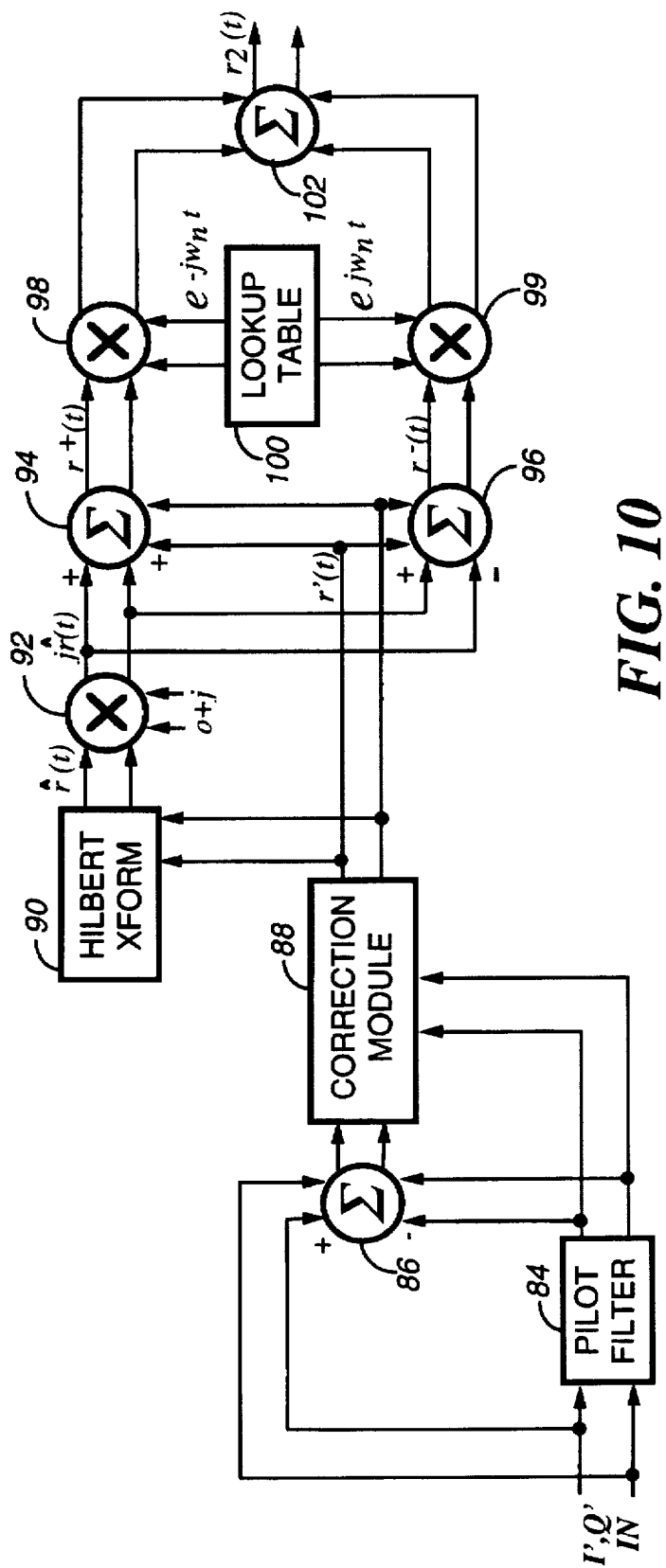
FIG. 10 is a block diagram of a portion of a preferred embodiment of the receiver of the present invention.

A portion of the receiver as depicted in FIG. 10 removes both the pilot carrier from the received signal as well as the notch from the received signal. More particularly, the receiver section shown in FIG. 10 receives as an input thereto the signals I'(t) and Q'(t) output from the QAM receiver 42. These signals are applied to a pilot carrier filter 84 which is bandpass filter that is used to separate the pilot carrier from the data signal without interference therebetween. The pilot filter may have gain vs. frequency characteristics as depicted by the dashed line 83 in FIG. 11 so as to separate the pilot carrier component from the message data signal. The recovered pilot carrier output from the filter 84 is subtracted from the received signal I'(t) and Q'(t) by a subtracter 86. The output of the subtracter 86 therefore ideally represents I(t)-p+jQ(t) where p represents the pilot carrier. The output of the subtracter 86 as well as the recovered pilot carrier are applied to a correction module 88 that uses the recovered pilot carrier to cancel the effects of amplitude or gain and phase variations in the transmission channel so as to yield a signal r(t) which is ideally equal to y(t)-p.

The signal r(t) is applied to a Hilbert transform filter 90 that produces the Hilbert transform $\hat{r}(t)$ of the signal r(t). It is noted that because of the notch in the received signal, r(t) has no frequency components at or near DC so that there is no difficulty in obtaining the Hilbert transform of r(t). The output of the Hilbert transform filter 90 is multiplied by (0+j) with a multiplier 92 to provide at the output thereof a signal representing $j\hat{r}(t)$. An adder 94 sums the signals r(t) and $j\hat{r}(t)$ so as to obtain at its the output the positive frequency component of the received signal. A subtracter 96 subtracts jf(t) from the signal r(t) so as to obtain at its output the negative frequency component of the received signal. The positive frequency component is multiplied by a complex exponential $e^{-j\omega t}$ by a multiplier 98 to shift the positive frequency component back to its original spectra. Similarly, a multiplier 99 multiplies the negative frequency component output from the subtracter 96 by the complex exponential $e^{j\omega t}$ to shift the negative frequency component back to its original spectra. Again, a number of values representing the complex exponentials may be stored in a look up table 100 for various sample times, t. The output of the multipliers 98 and 99 are summed by an adder 102 so as to generate a signal $r_2(t)$ which ideally is equal to i(t)+jq(t), the output of the pulse waveform generator 60 of the transmitter 40 representing the I-channel message data and the Q-channel message data.

The transmission system of the present invention as described above has the advantages of conventional QAM systems plus the advantages of systems utilizing a pilot carrier. Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. In a selective call message communication system having an amplitude modulation transmitter for transmitting digital message data, a system for generating a signal encoded with message data and a pilot carrier for transmission by said amplitude modulation transmitter comprising:
    a first waveform generator responsive to said message data for generating a data waveform corresponding to said message data;
    a Hilbert transform generator responsive to said message data for generating a waveform representing a Hilbert transform;
    means responsive to said data waveform and said Hilbert transform waveform for generating a positive frequency component and a negative frequency component; and
    means for shifting said positive and negative frequency components apart and summing said components to create a notch in a power spectrum of said summed components for a pilot carrier to be inserted therein.

2. A selective call message communication system as recited in claim 1 wherein said means for generating said positive frequency component includes an adder for adding said Hilbert transform waveform to said data waveform.

3. A selective call message communication system as recited in claim 1 wherein said means for generating said negative frequency component includes a subtracter for subtracting said Hilbert transform waveform from said data waveform.

4. A selective call message communication system as recited in claim 1 wherein said means for shifting the positive and negative frequency components includes a multiplier for multiplying said positive frequency component by $e^{j\omega t}$ and said negative frequency component by $e^{-j\omega t}$ to shift said components apart in frequency by $+\omega$ and $-\omega$.

5. A selective call message communication system as recited in claim 4 including a look up table for storing the negative and positive frequency components of $e^{j\omega t}$ and $e^{-j\omega t}$ as a function of a plurality of sample times, t.

6. A selective call message communication system as recited in claim 5 including a receiver for receiving a signal containing a notch in a power spectrum of the signal; means for generating positive and negative frequency components from said received signal; and means for shifting the positive and negative frequency components of said received signal to remove said notch.

7. A selective call message communication system as recited in claim 1 having a receiver for receiving an amplitude modulated signal formed from said message data and pilot carrier encoded signal transmitted from said amplitude modulation transmitter including
    a pilot filter for separating said pilot carrier from said received signal;
    means for subtracting said pilot carrier from said received signal to provide a pilot free signal;
    a Hilbert transform filter for generating the Hilbert transform of said pilot free received signal;
    means responsive to said Hilbert transform and said pilot free signal for generating a positive frequency component and a negative frequency component; and
    means for shifting said positive frequency component and said negative frequency component together in frequency and summing said shifted positive and negative frequency components to recover a signal representing said message data.

8. A selective call receiving message communication system as recited in claim 1 wherein said amplitude modulation transmitter is a quadrature amplitude modulation transmitter having first and second modulating inputs.

9. A selective call receiving message communication system as recited in claim 8 wherein said encoded signal includes a real and an imaginary component, said real component forming said first modulating input and said imaginary component forming said second modulating input.

10. A selective call receiving message communication system as recited in claim 8 wherein said first waveform generator is responsive to a first portion of said message data for generating a first data waveform to be transmitted via said first modulating input of said quadrature amplitude modulation transmitter and said first waveform generator is responsive to a second portion of said message data for generating a second data waveform to be transmitted via said second modulating input of said quadrature amplitude modulation transmitter.

11. A selective call receiving message communication system as recited in claim 10 wherein said Hilbert transform generator is responsive to a first portion of said message data for generating a Hilbert transform waveform to be transmitted via said first modulating input of said quadrature amplitude modulation transmitter and said Hilbert waveform generator is responsive to a second portion of said message data for generating a second Hilbert transform waveform to be transmitted via said second modulating input of said quadrature amplitude modulation transmitter.

12. A selective call message communication system as recited in claim 11 wherein said means for generating said positive frequency component includes an adder for adding said Hilbert transform waveforms to said data waveforms.

13. A selective call message communication system as recited in claim 11 wherein said means for generating said negative frequency component includes a subtracter for subtracting said Hilbert transform waveforms from said data waveforms.

14. In a selective call message communication system, a transmission system comprising:
    a transmitter including a first waveform generator responsive to said message data for generating a data waveform corresponding to said message data;

a Hilbert transform generator responsive to said message data for generating a waveform representing a Hilbert transform;

means responsive to said data waveform and said Hilbert transform waveform for generating a positive frequency component and a negative frequency component;

means for shifting said positive and negative frequency components apart and summing said components to create a notch in a power spectrum of said summed components;

means for adding a pilot carrier to said summed components in said notch to form a signal encoded with message data and a pilot carrier for transmission; and an amplitude modulator for amplitude modulating said encoded signal for transmission; and a receiver for receiving said encoded signal including
a pilot filter for separating said pilot carrier from said received signal;

means for subtracting said pilot carrier from said received signal to provide a pilot free signal;

a Hilbert transform filter for generating the Hilbert transform of said pilot free received signal;

means responsive to said Hilbert transform and said pilot free signal for generating a positive frequency component and a negative frequency component thereof; and means for shifting said positive frequency component and said negative frequency component together in frequency and summing said shifted positive and negative frequency components to recover a signal representing said message data.

15. A selective call message communication system as recited in claim 14 wherein said means for generating said positive frequency component in said transmitter includes an adder for adding said Hilbert transform waveform to said data waveform.

16. A selective call message communication system as recited in claim 14 wherein said means for generating said negative frequency component in said transmitter includes a subtracter for subtracting said Hilbert transform waveform from said data waveform.

17. A selective call message communication system as recited in claim 14 wherein said means for shifting the positive and negative frequency components apart includes a multiplier for multiplying said positive frequency component by $e^{j\omega t}$ and said negative frequency component by $e^{-j\omega t}$ to shift said components apart in frequency by $+\omega$ and $-\omega$.

18. A selective call message communication system as recited in claim 14 including a look up table for storing values of $e^{j\omega t}$ and $e^{-j\omega t}$ as a function of a plurality of sample times, t.

19. A selective call receiving message communication system as recited in claim 14 wherein said amplitude modulator is a quadrature amplitude modulator having first and second modulating inputs.

20. A selective call receiving message communication system as recited in claim 19 wherein said encoded signal includes a real and an imaginary component, said real component forming said first modulating input and said imaginary component forming said second modulating input.

21. A selective call receiving message communication system as recited in claim 19 wherein said first waveform generator is responsive to a first portion of said message data for generating a first data waveform to be transmitted via said first modulating input of said quadrature amplitude modulation transmitter and said first waveform generator is responsive to a second portion of said message data for generating a second data waveform to be transmitted via said second modulating input of said quadrature amplitude modulation transmitter.

22. A selective call receiving message communication system as recited in claim 21 wherein said Hilbert transform generator is responsive to a first portion of said message data for generating a Hilbert transform waveform to be transmitted via said first modulating input of said quadrature amplitude modulation transmitter and said Hilbert waveform generator is responsive to a second portion of said message data for generating a second Hilbert transform waveform to be transmitted via said second modulating input of said quadrature amplitude modulation transmitter.

23. A selective call receiving message communication system as recited in claim 14 wherein said receiver includes a quadrature amplitude modulation receiver.

24. In a selective call message communication system having an amplitude demodulation receiver for receiving an amplitude modulated transmitted signal formed from a message data encoded signal with a notch in a power spectrum thereof containing a pilot carrier, a system for recovering said message data comprising:

a pilot filter for separating said pilot carrier from said received signal;

means for subtracting said pilot carrier from said received signal to provide a pilot free signal;

a Hilbert transform filter for generating the Hilbert transform of said pilot free received signal;

means responsive to said Hilbert transform of said pilot free signal for generating a positive frequency component and a negative frequency component; and means for shifting said frequency components together and summing said shifted frequency components to recover a signal representing said message data.

25. A selective call receiving message communication system as recited in claim 24 wherein said amplitude demodulation receiver is a quadrature amplitude modulation receiver.

26. A method for transmitting digital message data in a selective call message communication system comprising:

generating a data waveform representing said message data;

generating a Hilbert transform of said message data;

combining said data waveform and Hilbert transform to generate a positive frequency component and a negative frequency component;

shifting said positive and negative frequency components apart;

adding said shifted positive and negative frequency components and a component representing a pilot carrier to form a message data encoded signal; and amplitude modulating said message data encoded signal for transmission thereof.

27. A method as recited in claim 26 including
receiving said amplitude modulated message data encoded signal;

demodulating the amplitude of said received signal;

removing the pilot carrier from said signal to provide a pilot free signal;

generating a Hilbert transform of said pilot free signal;

combining said Hilbert transform and said pilot free signal to form positive and negative frequency components; and shifting said frequency components together and summing said shifted frequency components to recover a signal representing said message data.

28. A method of receiving digital message data transmitted in a selective call receiving device as an amplitude modulation transmission of a message data encoded signal having a pilot carrier comprising:

receiving said amplitude modulated message data encoded signal;

demodulating the amplitude of said received signal;

removing the pilot carrier from said signal to provide a pilot free signal;

generating a Hilbert transform of said pilot free signal;

combining said Hilbert transform and said pilot free signal to form positive and negative frequency components; and shifting said frequency components together and summing said shifted frequency components to recover a signal representing said message data.

29. A method for transmitting digital message data in a selective call message communication system using a quadrature amplitude modulation transmitter having a first modulating input and a second modulating input comprising:

generating a first data waveform corresponding to a first portion of said message data;

generating a second data waveform corresponding to a second portion of said message data;

generating a Hilbert transform of said first portion of said message data;

generating a Hilbert transform of said second portion of said message data;

combining said data waveforms and said Hilbert transforms to generate a positive frequency component and a negative frequency component;

adding said shifted positive and negative frequency components to form a message data encoded signal, a first portion of said message data encoded signal forming said first modulating input and a second portion of said message data encoded signal forming said second modulating input.

* * * * *